United States Patent
Wright et al.

(10) Patent No.: US 12,445,287 B2
(45) Date of Patent: Oct. 14, 2025

(54) COMPUTER IMPLEMENTED METHOD AND SYSTEM FOR KNOWLEDGE PROOF IN BLOCKCHAIN TRANSACTIONS

(71) Applicant: nChain Holdings Limited, St. John's (AG)

(72) Inventors: Craig Steven Wright, London (GB); Alexander Tennyson Mackay, London (GB); Wei Zhang, London (GB)

(73) Assignee: NCHAIN LICENSING AG, Zug (CH)

( * ) Notice: Subject to any disclaimer, the term of this patent is extended or adjusted under 35 U.S.C. 154(b) by 682 days.

(21) Appl. No.: 17/603,332

(22) PCT Filed: Apr. 3, 2020

(86) PCT No.: PCT/IB2020/053214
§ 371 (c)(1),
(2) Date: Oct. 12, 2021

(87) PCT Pub. No.: WO2020/208491
PCT Pub. Date: Oct. 15, 2020

(65) Prior Publication Data
US 2022/0278843 A1     Sep. 1, 2022

(30) Foreign Application Priority Data

Apr. 12, 2019   (GB) ..................................... 1905198

(51) Int. Cl.
| | |
|---|---|
| *H04L 9/32* | (2006.01) |
| *H04L 9/00* | (2022.01) |
| *H04L 9/08* | (2006.01) |

(52) U.S. Cl.
CPC .......... *H04L 9/3218* (2013.01); *H04L 9/0825* (2013.01); *H04L 9/50* (2022.05); *H04L 2209/56* (2013.01)

(58) Field of Classification Search
CPC ........ H04L 9/3218; H04L 9/50; H04L 9/0825
(Continued)

(56) References Cited

U.S. PATENT DOCUMENTS

| | | |
|---|---|---|
| 4,995,082 A | 2/1991 | Schnorr |
| 10,050,779 B2 | 8/2018 | Alness et al. |

(Continued)

FOREIGN PATENT DOCUMENTS

| | | | |
|---|---|---|---|
| WO | WO-2017187396 A1 * | 11/2017 | ............... A01K 5/02 |
| WO | 2018189656 A1 | 10/2018 | |

OTHER PUBLICATIONS

Efficient Signature Generation by Smart Cards, Universitat Frankfurt, C.P. Schnorr (Mar. 1991) (Year: 1991).*

(Continued)

*Primary Examiner* — Dant B Shaifer Harriman
(74) *Attorney, Agent, or Firm* — Tarolli, Sundheim, Covell &Tummino LLP

(57) ABSTRACT

A method of enabling knowledge proof in a blockchain transaction is disclosed. The method comprises sending, from a verifier to a prover, a blockchain transaction redeemable by means of data including (i) first data (y) based on a combination of an ephemeral key (r), second data (c) and a private key of a public-private key pair of a cryptography system, wherein the public key (v) is based on an integer generator raised to a first power, wherein the first power is based on the private key, and wherein knowledge of the private key is required in order to determine the ephemeral key from the first data, and (ii) third data (x) based on the integer generator raised to a second power, wherein the second power is based on the ephemeral key.

12 Claims, 5 Drawing Sheets

```
<x> OP_SWAP
OP_IF
     OP_DUP OP_TOALTSTACK
OP_ENDIF
<0> OP_CAT OP_SWAP
OP_IF
     OP_DUP OP_TOALTSTACK
OP_ENDIF
<0> OP_CAT OP_SWAP
... (repeat t times)
<0> OP_CAT OP_SWAP
OP_IF
     OP_TOALTSTACK
OP_END_IF OP_FROMALTSTACK OP_FROMALTSTACK FUNC_STRINGADD
OP_FROMALTSTACK FUNC_STRINGADD
```

(58) Field of Classification Search
USPC .......................................................... 713/168
See application file for complete search history.

(56) References Cited

U.S. PATENT DOCUMENTS

| | | | | |
|---|---|---|---|---|
| 11,310,060 | B1* | 4/2022 | Poelstra | H04L 9/3066 |
| 11,481,841 | B2* | 10/2022 | Robotham | H04L 63/0807 |
| 2018/0096313 | A1* | 4/2018 | Chenard | G06F 21/64 |
| 2022/0368538 | A1* | 11/2022 | Gauthier | H04L 9/3263 |

OTHER PUBLICATIONS

Anonymous, "Find Sum of Two Nos. Using Only Bitwise Operators," https://prismoskills.appspot.com/lessons/Bitwise_Operators/Sum_using_only_bitwise_ops.jsp, 2019, 4 pages.
Antonopoulos, "Mastering Bitcoin—Unlocking Digital Cryptocurrencies," O'Reilly Media, Inc., Dec. 20, 2014, 282 pages.
Brady et al., "Is There an Algorithm to Split a Number Into the Sum of Powers of 2?," https://math.stackexchange.com/questions/1553894/is-there-an-algorithm-to-split-a-number-into-the-sum-of-powers-of-2, Nov. 30, 2015, 4 pages.
Chauhan, "Powers of 2 to Required Sum," Retrieved on May 6, 2022 from https://www.geeksforgeeks.org/powers-2-required-sum/, Apr. 24, 2018, 11 pages.
Dryja, "Discreet Log Contracts," MIT Media Lab, Sep. 2017, 9 pages.
Geeksforgeeks, "Add Two Numbers Without Using Arithmetic Operators," Retrieved on May 6, 2022 from https://www.geeksforgeeks.org/add-two-numbers-without-using-arithmetic-operators/, 15 pages.
International Search Report and Written Opinion mailed Oct. 15, 2020, Patent Application No. PCT/IB2020/053214, 7 pages.
Jivanyan, "Lelantus: A New Design for Anonymous and Confidential Cryptocurrencies," Apr. 7, 2019, 1 page.
Jivanyan, "Lelantus: Towards Confidentiality and Anonymity of Blockchain Transactions From Standard Assumptions," IACR Cryptology, 2019, 24 pages.
Nakamoto, "Bitcoin: A Peer-to-Peer Electronic Cash System," Bitcoin, Oct. 31, 2008, https://bitcoin.org/bitcoin.pdf, 9 pages.
Orlandi, "Faster Zero-Knowledge Protocols and Applications," International Conference on Financial Cryptography and Data Security, Oct. 29, 2017, 11 pages.
Raitsev et al., "How to Perform Multiplication, Using Bitwise Operators?," Retrieved on Aug. 6, 2020 from https://stackoverflow.com/questions/3722004/how-to-perform-multiplication-using-bitwise-operators/28158393#:~:text=To%20multiply%20by%20any%20value,N%20times%20to%20the%20left.&text=To%20divide%20shift%20the%20bits,whole%20value, Sep. 15, 2020, 5 pages.
Satoshi et al., "Connection Limits," Bitcoin Forum, Aug. 9, 2010, https://bitcointalk.org/index.php?topic=741.0;brev_next=prev, 2 pages.
Schnorr, "Efficient Identification and Signatures for Smart Cards," International Conference on Financial Cryptography and Data Security, 1990, 14 pages.
UK IPO Search Report mailed Dec. 19, 2019, Patent Application No. GB1905198.6, 5 pages.
Espel, et al., "Proposal for Protocol on a Quorum Blockchain with Zero Knowledge", Nov. 10, 2017, 22 pages.

* cited by examiner

```
OP_1 OP_SWAP

OP_IF

< n_0 > OP_MUL

OP_ENDIF

OP_SWAP OP_IF

< n_1 > OP_MUL

OP_ENDIF

OP_SWAP OP_IF

< n_2 > OP_MUL

OP_ENDIF

...

OP_SWAP OP_IF

< n_t > OP_MUL
```

```
OP_2DUP OP_XOR OP_ROT OP_AND OP_DUP
OP_IF
    < 0 > OP_CAT
    OP_2DUP OP_XOR OP_ROT OP_AND OP_DUP
    OP_IF
        < 0 > OP_CAT
        OP_2DUP OP_XOR OP_ROT OP_AND OP_DUP
        OP_IF
            ... (t nested Ifs)
        OP_ENDIF
    OP_ENDIF
```

```
< x > OP_SWAP
OP_IF
      OP_DUP OP_TOALTSTACK
OP_ENDIF
< 0 > OP_CAT OP_SWAP
OP_IF
      OP_DUP OP_TOALTSTACK
OP_ENDIF
< 0 > OP_CAT OP_SWAP
… (repeat t times)
< 0 > OP_CAT OP_SWAP
OP_IF
      OP_TOALTSTACK
OP_END_IF OP_FROMALTSTACK OP_FROMALTSTACK FUNC_STRINGADD
OP_FROMALTSTACK FUNC_STRINGADD
```

Figure 5

```
OP_IF
    <$r_t$> OP_TOALTSTACK
OP_ENDIF
OP_IF
    <$r_{t-1}$> OP_TOALTSTACK
OP_ENDIF
… (repeat $t-k$ times)
OP_CAT … OP_CAT (repeat $k$ times) OP_TOALTSTACK
OP_FROMALTSTACK OP_FROMALTSTACK FUNC_STRINGADD
OP_FROMALTSTACK FUNC_STRINGADD
… (repeat $t-k+1$ times)
OP_FROMALTSTACK FUNC_STRINGADD
FUNC_SPLITSTRINGTOBIT
… repeat $\log_2 \log_2(t-k)$ t
```

Figure 6

COMPUTER IMPLEMENTED METHOD AND SYSTEM FOR KNOWLEDGE PROOF IN BLOCKCHAIN TRANSACTIONS

CROSS-REFERENCE TO RELATED APPLICATION

This application is a 371 National Stage Patent Application of International Patent Application No. PCT/IB2020/053214, filed on Apr. 3, 2020, which claims priority to United Kingdom Patent Application No. 1905198.6, filed Apr. 12, 2019, the disclosures of which are incorporated herein by reference in their entirety.

TECHNICAL FIELD

This disclosure relates generally to a knowledge proof system for blockchain transactions, and more particularly to an on-chain non-interactive implementation of a knowledge proof system. The disclosure is particularly suited, but not limited to, use in a signature scheme for arbitrary data authentication.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that this disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain.

Knowledge proof is a cryptographic system that allows one party to prove to another party that he or she knows a secret without revealing any information on the secret. There are many instantiations of a knowledge proof system. However, most of them are computationally costly.

Thus, it is desirable to provide a knowledge proof system for blockchain transaction which is more computationally efficient than existing knowledge proof systems.

Such an improved solution has now been devised.

SUMMARY

There is provided a method as defined in the appended claims.

There may be provided a method of enabling knowledge proof in a blockchain transaction, the method comprising: sending, from a verifier to a prover, a blockchain transaction redeemable by means of data including (i) first data based on a combination of an ephemeral key, second data and a private key of a public-private key pair of a cryptography system, wherein the public key is based on an integer generator raised to a first power, wherein the first power is based on the private key, and wherein knowledge of the private key is required in order to determine the ephemeral key from the first data, and (ii) third data based on the integer generator raised to a second power, wherein the second power is based on the ephemeral key.

There may be provided a computer implemented method of determining the value of 2 raised to a power of an integer, the method comprising:
determining coefficients of terms of a series of powers of 2, wherein each term of the series comprises a respective power of 2 multiplied by a respective said coefficient, wherein the respective said coefficient of each said term is 0 or 1, and the sum of said terms is equal to said integer; and
determining said coefficients having a respective value of 1;

determining a product of a plurality of values, wherein each said value is 2 raised to a respective power of 2 corresponding to each term of the series for which the corresponding said coefficient has a value of 1.

There may be provided a computer implemented method of adding two integers in a blockchain transaction, the method comprising:

representing the integers as a pair of binary bit strings;
performing, on said pair of binary bit strings as inputs, a combination step comprising (i) XOR combining pairs of corresponding respective bits of said inputs to generate a first output binary bit string, and (ii) AND combining pairs of corresponding respective bits of said inputs to generate a further bit string and concatenating, as least significant bit, a bit of value 0 to said further bit string to generate a second output binary bit string; and
if said second output binary bit string contains any bits of value 1, repeating said combination step using as inputs the outputs of the previous said combination step until a said second output binary bit string containing only bits of value 0 is generated.

There may be provided a method of determining a product of two integers in a blockchain transaction, the method comprising:

representing first and second integers as respective first and second binary bit strings; for each bit of the first integer having a value of 1, providing a respective stored bit string comprising the bit string representing the second integer and a number of bits of value 0 added thereto as least significant bits, the number being equal to the power of 2 represented by the corresponding bit of the first integer having a value of 1; and
adding together the stored bit strings by means of at least one method as defined above.

There may be provided a method of determining an integer in modular arithmetic, the method comprising:
determining coefficients of terms of a series of powers of 2 (mod p), wherein each term of the series comprises a respective power of 2 (mod p) multiplied by a respective said coefficient, wherein the respective said coefficient of each said term is 0 or 1, and the sum of said terms is equal to said integer (mod p);
storing a plurality of values, wherein each said value is 2 raised to a respective power of 2 (mod p) corresponding to each term of the series for which the corresponding said coefficient has a value of 1; and
adding together the plurality of values by means of at least one method as defined above.

There may be provided a system, comprising:
a processor; and
memory including executable instructions that, as a result of execution by the processor, causes the system to perform any embodiment of the computer-implemented method described herein.

There may be provided a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF THE DRAWINGS

Various embodiments in accordance with the present disclosure will be described with reference to the drawings, in which:

FIG. 5 shows execution of a script of a blockchain transaction for determining a product of two large integers;

FIG. 6 shows execution of a script of a blockchain transaction for determining a large integer in modular arithmetic.

DESCRIPTION OF EMBODIMENTS

Figures 1, 2:
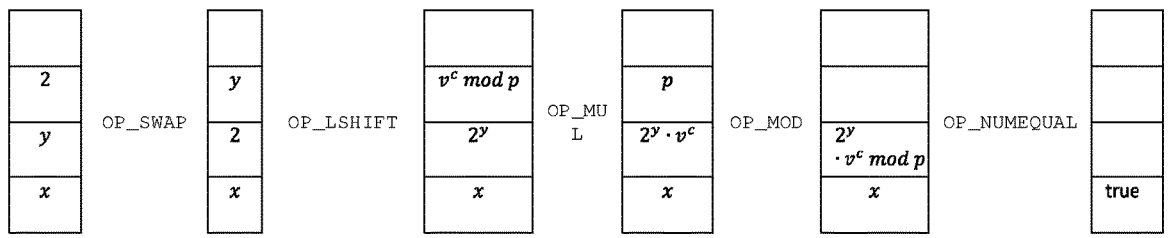
FIG. 1 shows execution of a script of a blockchain transaction for carrying out knowledge proof.
FIG. 2 shows execution of a script of a blockchain transaction for determining a large power of 2.

The knowledge proof system of the present disclosure is an implementation of Schnorr's identification scheme [C. P. Schnorr (1990). 'Efficient Identification and Signatures for Cards' in G. Brassard ed. Adv. In Cryptology—Crypt 239-252. Springer Verlag (1990) Lecture Notes in Computer Science nr 435]. The scheme is not only conceptually simple, but it also only uses OP codes that are defined in the original bitcoin protocol. As a result, it can be easily embedded in a script in a transaction. An on-chain non-interactive implementation of the knowledge proof system is described, as well as two other implementations including a transform to a signature scheme for arbitrary data authentication.

The following remarks and user cases of the present disclosure should be noted. The knowledge proof system can be embedded in as few as one transaction if the public verification key is available elsewhere. Also, the payment can be spent only if the receiver knows the secret value. In particular, public keys (verification keys) do not have to be visible to the public or included in the transaction. This will provide full privacy for the receiver. Also, security can be adjusted by choosing different primes. This will provide the flexibility in trade-off between efficiency and security.

When proof of knowledge implies proof of ownership, the solution becomes a smart contract that says the funding is released only if the receiver can prove the ownership of some asset. As an example, a land registry office can implement the same knowledge proof system to record the ownership of properties. The land registry office can have a certified verification key list, where each owner is given their corresponding secret value. To prove an ownership of a property, the owner can simply construct a knowledge proof given a challenge. It is important to note that the verification key does not have to be included in the transactions. It can be hidden in a calculation.

Another example could be any token system that implements the knowledge proof system. Similarly, as above, the ownership of some tokens can be proved by constructing a knowledge proof of a secret value. The solution can also be used in rental services, where the key to unlock the rented property is the knowledge proof which can be obtained by initiating a transaction that contains the same challenge. For example, in order to access a rented car, or a house, the renter will receive a challenge to provide a knowledge proof from the locked door. The renter then constructs a transaction containing the challenge. The owner of the property will reveal the knowledge proof on accepting the payment, and therefore reveal the knowledge proof required to unlock the car or the door to the house.

The disclosure can also be a solution to asset transfer that involves a third party. For example, a lawyer (third party) is instructed by a will of his client to release a fund only to the person who knows the secret value.

Before outlining the specific embodiments of the disclosure, Schnorr's original protocol here [C. P. Schnorr (1990). 'Efficient Identification and Signatures for Cards' in G. Brassard ed. Adv. In Cryptology—Crypt 239-252. Springer Verlag (1990) Lecture Notes in Computer Science nr 435] is disclosed.

Setup (Public):
 1. Pick a prime p
 2. Pick a prime q such that q|p−1 (i.e. p−1 is divisible by q) and $2^q \equiv 1 \mod p$
    The public parameters are (p, q)

KeyGen (Prover):
 1. Randomly pick $s \in \mathbb{Z}_q$
 2. Calculate $v \equiv 2^{-s} \mod p$
    The secret value is s and the public verification key is v
 3. Send v to Verifier Challenge (Verifier):
 1. Randomly pick $c \in \mathbb{Z}_q$
 2. Send c to Prover Prove (Prover):
 1. Randomly pick $r \in \mathbb{Z}_q$
 2. Calculate $x \equiv 2^r \mod p$
 3. Calculate $y \equiv r + s \cdot c \mod q$
 4. Send (x, y) to Verifier Verify (Verifier):
 1. Calculate $x' \equiv 2^y \cdot v^c \mod p$
 2. Compare x' with x For the public parameters, they represent a subgroup of order q of the multiplicative group, $\mathbb{Z}_p$. The condition that $2^q \equiv 1 \mod p$ is to have 2 as the subgroup generator. This improves the efficiency in exponentiation significantly.

The security of the scheme is based on the discrete logarithm problem. For a group of size N, the security is roughly $\sqrt{N}$. For example, if q is of 256 bits, then the security of the scheme is roughly 128 bits. That is, it takes an attacker about $2^{128}$ operations to break the system.

For reference, the signature scheme that is obtained via the Fiat-Shamir Transform is also presented as follows:

Setup (Public):
 1. Pick a prime p
 2. Pick a prime q such that q|p−1 and $2^q \equiv 1 \mod p$ KeyGen (Signer):
 1. Randomly pick $s \in \mathbb{Z}_q$
 2. Calculate $v \equiv 2^{-s} \mod p$
    The secret key is s and the public key is v Sign (Signer given a message m):
 1. Randomly pick $r \in \mathbb{Z}_q$
 2. Calculate $x \equiv 2^r \mod p$
 3. Calculate $c \equiv H(x\|m) \mod q$
 4. Calculate $y \equiv r + s \cdot c \mod p$
 5. Send (m, x, y) to the verifier Verify (Verifier):
 1. Calculate $c \equiv H(x\|m) \mod q$
 2. Calculate $x' \equiv 2^y \cdot v^c \mod p$
 3. Compare x' with x It should be noted that the main difference between the knowledge proof and signature schemes is the replacement of the challenge c with $H(x\|m) \mod q$.

Knowledge Proof in Transactions

Non-Interactive Transaction

A transaction from Bob to Alice is described, in which case Alice can spend the payment only if Alice provide a knowledge proof.

It is assumed that Bob has a copy of the public parameters (p, q) and Alice's verification key v either from Alice herself or from a verifiable source.

Bob can simply construct the transaction and include the following outputs:

Transaction 1—from Bob to Alice

Output 1:
 Value: 10.00000000
 Locking Script: "<2>OP_SWAP OP_LSHIFT<$v^c$ mod p>OP_MUL<p>OP_MOD OP_NUMEQUAL"

It is assumed that $v^c$ mod p is calculated by Bob off-block, and the value entry is arbitrary. To achieve perfect privacy, Bob sends to Alice the challenge c off-chain, or they have some shared randomness as the challenge.

For Alice to spend the payment, she simply computes x and y as instructed in the protocol, and construct a transaction with the unlocking script as the following:

Spending Transaction 1

Unlocking script: "<Alice's public key><x><y>"

To verify the transaction, the scripts are executed as shown in FIG. 1:

Execution

"<x><y><2>OP_SWAP OP_LSHIFT<$v^c$ mod p>OP_MUL<p>OP_MOD OP_NUMEQUAL"

It should be noted that $v^c$ mod p can be pre-calculated and put in the script. This not only saves the computation to enable in-script verification, but also hides the public verification key.

In order to protect the integrity of the outputs of the transaction that Alice creates, an ECDSA signature request id appended to the locking script in Bob's transaction. Namely:

Locking Script: "<2>OP_SWAP OP_LSHIFT<$v^c$ mod p>OP_MUL<p>OP_MOD OP_NUMEQUAL OP_IF OP_DUP OP_HASH160<Hash of Alice's public key>OP_EQUALVERITY OP_CHECKSIG".

In response, when Alice spends that transaction, she will sign the new transaction with her ECDSA signature. Namely:

Unlocking script: "<Alice's signature><Alice's public key><x><y>"

In the case of y being a large number, it is necessary to implement a more complicated script to calculate $2^y$ mod p, which involves bitwise calculations. The implementation will be possible if the current cap on the maximum number of opcodes is significantly lifted. The script is shown in detail in FIG. 2.

It has been assumed that the arithmetic opcodes used are equipped with the big integer library, which was the case in the bitcoin original protocol. However, other embodiments are shown in detail in FIGS. 4 to 6 that simulate big integer arithmetic operations using string operations.

Calculating $2^y \bmod p$

The script shown in FIG. 2 is executed by implementing the following steps:
1. Write $y=y_0 2^0+y_1 2^1+\ldots+y_t 2^t$ where $y_i \in \{0,1\}$ for $i=0, 1, \ldots, t$, which is the binary representation of y.
2. Let $n_i=2^{2^i} \bmod p$ be pre-calculated.
3. Note that $2^y=n_0^{y_0} n_1^{y_1} \ldots n_t^{y_t} \bmod p$ and $n_i^{y_i}=n_i$ when $y_i=1$.
4. Assuming y is pushed to the stack as $(y_0, y_1, \ldots, y_t)$ with $y_0$ being on the top stack:

Now the top stack will have $2^y \bmod p$.

It should be noted that the current maximum stack depth is 1000. If 128 bits of security is to be achieved, then y will be of 256 bits. Therefore, the current cap on stack depth is not a problem.

Figures 3, 4:
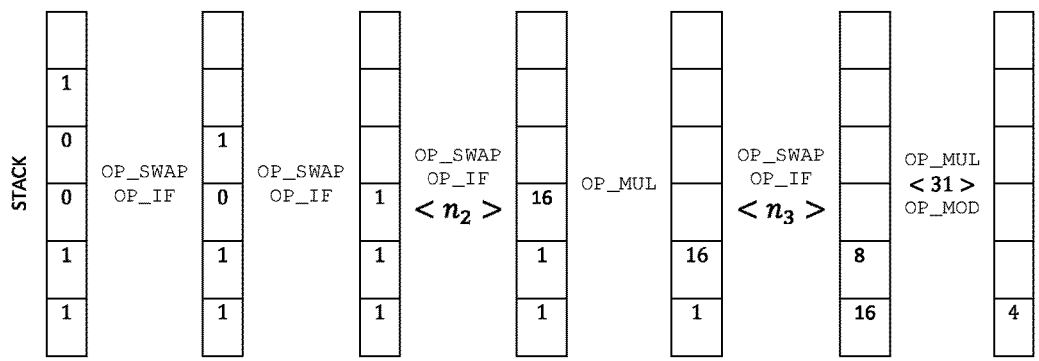
FIG. 3 shows execution of a script of a blockchain transaction of a specific example of the script shown in FIG. 2.
FIG. 4 shows execution of a script of a blockchain transaction for determining a sum of two large integers.

An example of the execution of the script shown in FIG. 2 is shown in detail in FIG. 3.

Example: calculate $2^{12} \bmod 31$
1. Write $12=2^2+2^3$
2. Pre-calculate $n_0, n_1, n_2, n_3$ as 2, 4, 16, 8.
3. Push (1,1,0,0) to the stack one by one followed by OP_1.

The script of FIG. 2 is then executed as shown in FIG. 3.

One Round Transactions

If there is a requirement for on-chain communication, it is straightforward for Alice to initiate the communication by sending Bob a transaction and pass on the public verification key.

Transaction 0—from Alice to Bob

Output 1:
Value: 0.00000600
Locking Script: "OP_DUP OP_HASH160 <Hash of Bob's public key>OP_EQUALVERIFY OP_CHECKSIG"
Output 2:
Value: 0.00000000
Locking Script: "OP_RETURN v"

It should be noted that Output 1 is there to simply cover the transaction fee for miners. Output 2 can also be included in Output 1 using "<v>OP_DROP".

The second leg of the round will be the transaction described in the non-interactive case plus the challenge c embedded in the locking script. This can be done either using a new output with OP_RETURN, or adding "<c>OP_DROP" to the existing locking script.

Implementation as a Signature Scheme

The Schnorr scheme can also be used as a method for source verification of arbitrary data types, in other words, a digital signature scheme. As of now, any digital signature scheme that involves large integer exponentiations is avoided in bitcoin due to its heavy computational cost. Since it is possible to pre-calculate the costly exponentiation off-chain, the Schnorr signature scheme described above can be implemented in bitcoin script. The important technical difference between the knowledge proof and digital signature is that for the digital signature the challenge issued by the verifier is the hash of the message or data and ephemeral public key used in the signature (see above).

The difficulty here is that Bob does not know the ephemeral public key before any signatures. One way to overcome that is for the signer to send the ephemeral public key before Bob creates the transaction. A better way would be to have a set of shared ephemeral public keys between the signer and Bob.

For example, Bob wants to send some bitcoin to Alice, which she can only spend if she provides a valid signature (x, y) for the message m by a signer with public key v who is trusted by Bob. He can construct the following transaction:

Transaction 1—from Bob to Alice

Output 0:
Value: 10.00000000
Locking Script: "<x>OP_SWAP OP_CAT OP_HASH256 <q>OP_MOD <c>OP_EQUALVERIFY <2>OP_SWAP OP_LSHIFT <$v^c$ mod p>OP_MUL<p>OP_MOD OP_NUMEQUAL OP_DUP OP_HASH160<Hash of Alice's public key>OP_EQUALVERIFY OP_CHECKSIG"

It is assumed that $v^c \bmod p$ is calculated by Bob off-chain.

To spend the payment from Bob, Alice first obtains a signature (x, y) from the signer on the message m.

It should be noted that both x and m are fixed in the locking script by the equation $c=H(x\|m) \bmod q$. The value of y becomes the key to provide authenticity.

Alice then can construct a transaction with the following unlocking script:

Spending Transaction 1

Unlocking script: <Alice's signature><Alice's public key><x><y><m>

It should be noted that this script does not require Alice to create the signature for m, only provide the signature created by the signer with public key v. The last 4 opcodes (from OP_DUP to OP_CHECKSIG) of the locking script set out above ensure that Alice's private key is also required to spend the transaction.

The signature scheme implementation does not provide the same level of privacy as the knowledge proof system implementation, because the challenge c has to be included in the locking script together with $v^C \bmod p$. It is not computationally difficult to derive v from c and $v^c \bmod p$.

The message being signed must also be known to the verifier, who provides both $c(=H(x\|m) \bmod q)$ and $v^c$ in the locking script. Whilst this limits the ability of the implementation to provide a method for verification of undetermined data, if the message space is small a verifier can use flow control opcodes to first determine the message and then the Schnorr scheme to authenticate.

For example, Bob creates a transaction that requires the approval of a third party (Carol) if Alice wishes to spend it. In this case the message being signed is a Boolean value i.e. $m \in \{m_1, m_2\}$ where $m_1=$'Yes', $m_2=$'No'. Bob does not know which message will be included as part of the unlocking script but wants to verify that it has been signed by Carol with public key v. If the message from Carol is 'Yes' then Alice can spend, if it is 'No' then it is returned to Bob.

The corresponding challenges to $m_1$ and $m_2$ are $c_1=H(x_1\|m_1)$ and $c_2=H(x_2\|m_2)$ respectively. Bob creates the following locking script:

Transaction 2—from Bob to Alice

Output 0:
Value: 10.00000000
Locking Script:
"<$x_1$>OP_SWAP OP_CAT OP_HASH256<q>OP_MOD<$c_1$>OP_EQUAL OP_IF<2>OP_SWAP OP_LSHIFT<$v^{c_1}$ mod p>OP_MUL<p>OP_MOD OP_NUMEQUAL OP_DUP OP_HASH160 <Hash of Alice's public key>OP_EQUALVERIFY OP_CHECKSIG OP_ENDIF <$x_2$>OP_SWAP OP_CAT OP_HASH256<q>OP_MOD<$c_2$>OP_EQUAL OP_IF<2>OP_SWAP OP_LSHIFT<$v^{c_2}$ mod p>OP_MUL<p>OP_MOD OP_NUMEQUAL OP_DUP OP_HASH160<Hash of Bob's public key>OP_EQUALVERIFY OP_CHECKSIG OP_ENDIF"

The locking script first checks the message is either $m_1$ or $m_2$ and verifies that it has been signed by Carol and finally checks that the rightful spender is unlocking the transaction. If, for example the message Carol wishes to sign is $m_1$='Yes' then she can generate a signature ($x_1$, $y_1$) corresponding to her chosen message and send the message/signature to Alice. Alice can then create the following unlocking script to spend the transaction:

Spending Transaction 2

Unlocking script: <Alice Sig.><Alice PubKey ><$x_1$><$y_1$><$m_1$>

This data scheme lays the foundation for secure data source verification using bitcoin script. If Bob wishes to attach additional spending criteria dependent on the message/data (for example in a smart contract) then additional script can included in Transaction 2.

Calculating x+y

A script for adding two large integers together is shown in detail in FIG. 4. It is assumed that the integers (x, y) are pushed to the stack as two binary strings. This script will be denoted as FUNC_STRINGADD in further embodiments.

The Theory Behind the Addition

Let $a_0$ and $b_0$ be two binary strings of length t. We define:

$a_{i+1} = a_i \oplus b_i$ $b_{i+1} = a_i \wedge b_i \| 0$ where $\oplus$ represents bitwise XOR operation, and $\wedge$ represents bitwise AND operation.

When the process is repeated a sufficient number of times that $b_k = 00 \ldots 0$, a string of zeros, then $a_k$ is the binary string that represents $a_0 + b_0$.
Proof:
It should be noted that XOR simulates addition bitwise in the sense that all carries are not considered.

$0+0=0\oplus 0$ $0+1=1+0=1\oplus 0=0\oplus 1$ $1+1=1\oplus 1*$

The only problem is 1+1 is not 0. However, $\wedge$ operation can be used to identify this scenario, because $\wedge$ will indicate at which position this problem occurred by flagging it with 1. It should be noted that these ones in the result indicate the carries that are part of the addition. By concatenating the result with 0, we effectively create a number that captures all the carries. This process can be iterated until there are no more carries in the addition.

Proof by Induction

We want to prove that $a_0 + b_0 = a_1 + b_1 = \ldots = a_n + b_n$ for all $n \geq 1$.

First, we want to prove $a_0 + b_0 = a_1 + b_1$.

Let $a_0 = a_{00} \ldots a_{0t-1}$ and $b_0 = b_{00} b_{01} \ldots b_{0t-1}$ for some integer t.

When t=1, we have $a_0 = a_{00}$ and $b_0 = b_{00}$. So, the left-hand side is simply $a_{00} + b_{00}$.

The right-hand side is $a_1 + b_1 = a_{00} \oplus b_{00} + a_{00} \wedge b_{00} \| 0$ By going through all possible values of $a_{00}$ and $b_{00}$ as shown in the Table 1 below, we can conclude that the statement is true for t=1.

TABLE 1

| ($a_{00}$, $b_{00}$) | Left-hand side | $a_{00} \oplus b_{00}$ | $a_{00} \wedge b_{00} \| 0$ | Right-hand side |
| --- | --- | --- | --- | --- |
| (0, 0) | 0 | 0 | 00 | 0 |
| (0, 1) | 1 | 1 | 00 | 1 |
| (1, 0) | 1 | 1 | 00 | 1 |
| (1, 1) | 10 | 0 | 10 | 10 |

Assume the statement is true for t=k for some k≥1. We want to prove that the statement is true for t=k+1.

$$l.h.s = a_0 + b_0$$
$$= \sum_{i=0}^{k}(a_{0i} + b_{0i}) \cdot 2^{k-1}$$
$$= \left[\sum_{i=0}^{k-1}(a_{0i} + b_{0i}) \cdot 2^{k-1-i}\right] + (a_{0k} + b_{0k})$$

$$r.h.s. = a_1 + b_1$$
$$= \sum_{i=0}^{k}(a_{0i} \oplus b_{0i}) \cdot 2^{k-i} + (a_{0i} \wedge b_{0i} \| 0) \cdot 2^{k-i}$$
$$= \left[\sum_{i=0}^{k-1}(a_{0i} \oplus b_{0i}) \cdot 2^{k-1-i} + (a_{0i} \wedge b_{0i} \| 0) \cdot 2^{k-1-i}\right] +$$
$$(a_{0k} \oplus b_{0k}) + (a_{0k} \wedge b_{0k} \| 0)$$
$$= \left[\sum_{i=0}^{k-1}(a_{0i} + b_{0i}) \cdot 2^{k-1-i}\right] + (a_{0k} + b_{0k})$$
$$= l.h.s.$$

It should be noted that the fact that the statement is true for t=k has been used. That is:

$$\sum_{i=0}^{k-1}(a_{0i} \oplus b_{0i}) \cdot 2^{k-1-i} + (a_{0i} \wedge b_{0i} \| 0) \cdot 2^{k-1-i} = \sum_{i=0}^{k-1}(a_{0i} + b_{0i}) \cdot 2^{k-1-i}$$

Also, the fact that:

$a_{0i} \wedge b_{0i} \cdot 2 = a_{0i} \wedge b_{0i} \| 0$ has been used. Multiplying by 2 is the same as shifting the bit string to the left by one position and appending 0 at the end.

The last equality in the deduction comes from the Table 1 above again.

Since it has been proved that the statement is true for t=k+1 given it is true for t=k, by induction, it can be concluded that $a_0+b_0=a_1+b_1$ is true for all integer $t\geq 1$.

It should be noted that $a_1$ and $b_1$ are just two binary strings representing two numbers as $a_0$ and $b_0$. Without loss of generality, by repeating the proof above, it can be concluded that $a_0+b_0=a_1+b_1=a_n+b_n$ for all $n\geq 1$. Consequently, when the process is iterated until one of the outputs consists entirely of bits having value 0, it can be concluded that the other output represents the sum of the two initial inputs.

Calculating x·y

A script for multiplying two large integers together is shown in detail in FIG. 5.

One of the integers, y, is written as $y=y_0 2^0+y_1 2^1+\ldots+y_t 2^t$ where $y_i\in\{0,1\}$ for $i=0,1,\ldots,t$. It is assumed y is pushed to the stack as $(y_0, y_1, \ldots, y_t)$ with $y_0$ being on the top stack.

The script then saves a value of the other integer, x, with a number of bits of value 0 corresponding to the power of 2 represented by each non-zero value of $y_i$, added as least significant bits. These values are then added to each other by means of the FUNC_STRINGADD process described above with reference to FIG. 4.

Calculating y mod p

A script for calculating a large integer in modular arithmetic is shown in detail in FIG. 6. The values $r_i \equiv 2^i$ mod p are first pre-calculated for $i=k-1,\ldots,t$ where k is the bit length of p. It is assumed y is pushed to the stack as $(y_0, y_1, \ldots, y_t)$ with $y_t$ being on the top stack.

Finally, FUNC_SPLITSTRINGTOBIT is defined to take an input of binary string and put each bit vertically on the stack. This can be achieved by using OP_SUBSTR.

CONCLUSION

A protocol implementation has been described that enables a payment from Bob to Alice that can be spent only if Alice knows a secret value. The advantages of the present disclosure come from its simplicity, security, usefulness and being compatible with the most secure and trusted bitcoin original protocol.

The choice of using an integer representation instead of elliptic curve representation makes it much simpler to implement and understand. The fact that only the public key to the power of a random number is required to be published provides the security in terms of privacy of the receiver. Moreover, the value can be pre-calculated to enable on-chain verification and save the computation.

An innovative and efficient implementation of exponentiation modulo a prime has also been described. This enables the knowledge proof system to be embedded in a script in a standard transaction that would be accepted by the miners in the bitcoin network. As a by-product, an implementation of a signature scheme is also provided that allows in-script arbitrary data authentication and verification. Moreover, all the standard properties and extensions of Schnorr the signature scheme apply. For example, the batch validation enables the verification on multiple signatures in one step by aggregating them first. Another example is the extension to threshold signatures which is an alternative to MULTISIG in bitcoin.

Figure 7:
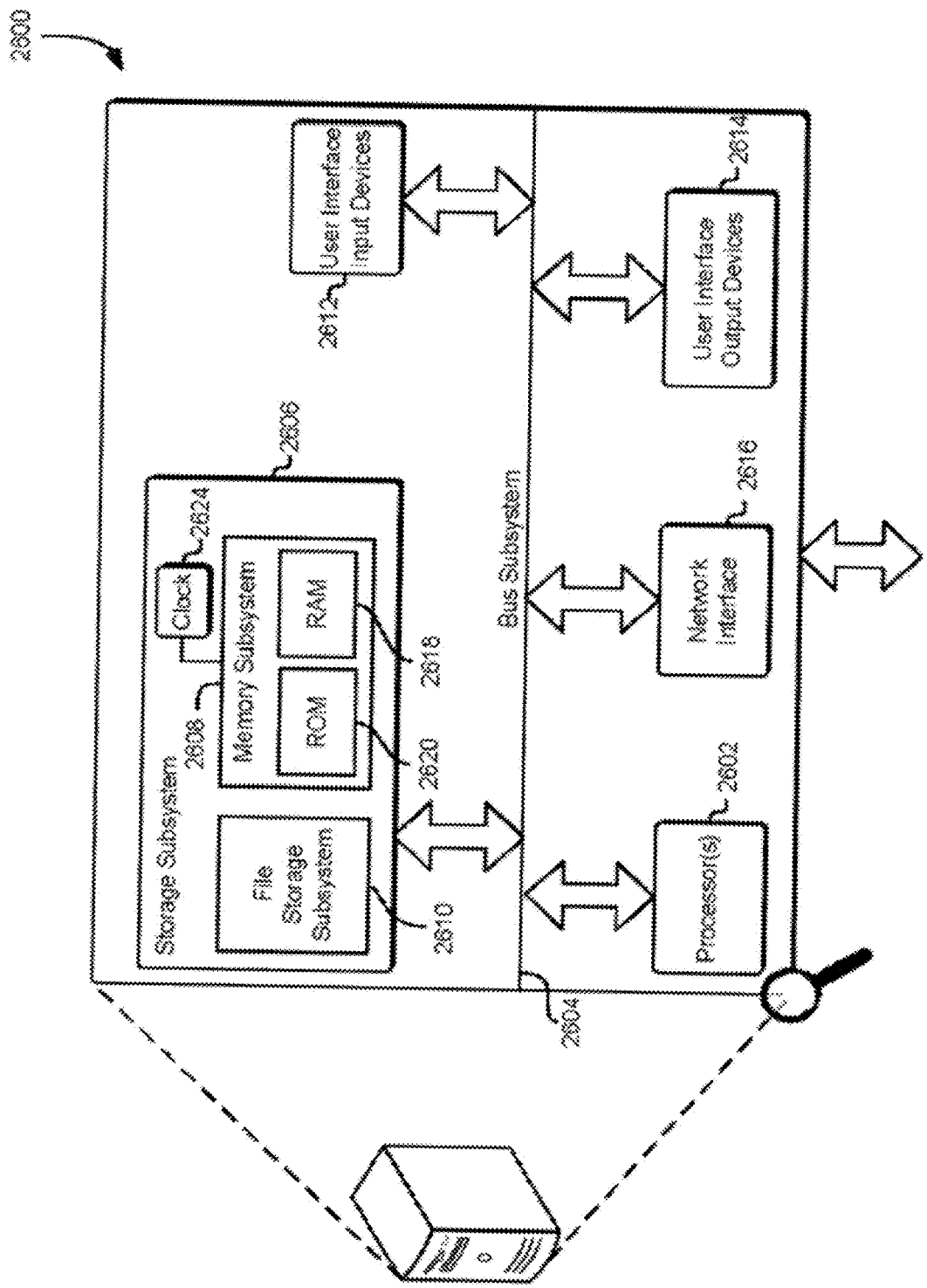
FIG. 7 is a schematic diagram illustrating a computing environment in which various embodiments can be implemented.

Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

ENUMERATED EXAMPLE EMBODIMENTS

Examples of the embodiments of the present disclosure can be described in view of the following clauses:

1. A method of enabling knowledge proof in a blockchain transaction, the method comprising:
sending, from a verifier to a prover, a blockchain transaction redeemable by means of data including (i) first data based on a combination of an ephemeral key, second data and a private key of a public-private key pair of a cryptography system, wherein the public key is based on an integer generator raised to a first power, wherein the first power is based on the private key, and wherein knowledge of the private key is required in order to determine the ephemeral key from the first data, and (ii) third data based on the integer generator raised to a second power, wherein the second power is based on the ephemeral key.

By providing a blockchain transaction redeemable by means of data based on a cryptography system, wherein the public key is based on an integer generator raised to a first power, wherein the first power is based on the private key, this provides the advantage of being computationally simple and efficient, and therefore not as computationally expensive as other cryptography systems such as elliptic curve cryptography. By making the data necessary for redeeming the transaction contain first data based on a combination of an ephemeral key, second data and a private key of a public-private key pair of and wherein knowledge of the private key is required in order to determine the ephemeral key from the first data, and third data based on the integer generator raised to a second power, wherein the second power is based on the ephemeral key, this provides the advantage of enabling a verification to be made that the first data contains the private key, without the necessity of disclosing the private key. By determining the second data, this shows that the party constructing the first and third data must be in possession of the private key.

2. A method according to clause 1, wherein the integer generator is 2.

This provides the advantage of being more computationally efficient.

3. A method according to clause 1 or 2, wherein the second data is selected by the verifier.

This provides the advantage of ensuring that the party constructing the first data is in possession of the private key.

4. A method according to any one of the preceding clauses, further comprising sending the second data from the verifier to the prover separately from the blockchain transaction.

This provides the advantage of increased privacy.

5. A method according to any one of the preceding clauses, wherein the first data is of the form:

$$y = r + s \cdot c \bmod q,$$

where y is the first data, r is the ephemeral key, s is the private key, c is the second data and q is prime.

6. A method according to any one of the preceding clauses, wherein the second data is based on a message.

7. A method according to clause 6, wherein the message includes data for implementing a smart contract.

8. A method according to clause 6 or 7, wherein the second data is of the form:

$$c = H(x \| m) \bmod q$$

where c is the second data, x is the third data, m is the message, q is prime and H is a hash function.

9. A method according to any one of clauses 6 to 8, further comprising receiving the message at the verifier.

10. A method according to any one of the preceding clauses, further comprising sharing at least one ephemeral key between the verifier and the prover.

11. A method according to any one of the preceding clauses, further comprising receiving said public key at said verifier.

12. A method according to any one of the preceding clauses, further comprising receiving said first data and said second data at said verifier.

13. A computer implemented method of determining the value of 2 raised to a power of an integer, the method comprising:
determining coefficients of terms of a series of powers of 2, wherein each term of the series comprises a respective power of 2 multiplied by a respective said coefficient, wherein the respective said coefficient of each said term is 0 or 1, and the sum of said terms is equal to said integer; and
determining said coefficients having a respective value of 1;
determining a product of a plurality of values, wherein each said value is 2 raised to a respective power of 2 corresponding to each term of the series for which the corresponding said coefficient has a value of 1.

This provides the advantage of being computationally efficient by enabling the coefficients to be represented by a string of binary bits.

14. A method according to clause 13, wherein the values are pre-calculated and stored.

15. A method according to clause 13 or 14, wherein the method is implemented by a blockchain transaction.

16. A method according to any one of clauses 13 to 15, wherein the method determines the value of $2^y$ mod p, where y is the integer.

17. A method according to any one of clauses 13 to 16, wherein the method is used to provide a blockchain transaction in a method as defined in any one of clauses 1 to 12.

18. A computer implemented method of adding two integers in a blockchain transaction, the method comprising:

representing the integers as a pair of binary bit strings;
performing, on said pair of binary bit strings as inputs, a combination step comprising (i) XOR combining pairs of corresponding respective bits of said inputs to generate a first output binary bit string, and (ii) AND combining pairs of corresponding respective bits of said inputs to generate a further bit string and concatenating, as least significant bit, a bit of value 0 to said further bit string to generate a second output binary bit string; and
if said second output binary bit string contains any bits of value 1, repeating said combination step using as inputs the outputs of the previous said combination step until a said second output binary bit string containing only bits of value 0 is generated.

This provides the advantage of enabling computationally efficient addition of large integers to be carried out in a blockchain transaction.

19. A method of determining a product of two integers in a blockchain transaction, the method comprising:

representing first and second integers as respective first and second binary bit strings; for each bit of the first integer having a value of 1, providing a respective stored bit string comprising the bit string representing the second integer and a number of bits of value 0 added thereto as least significant bits, the number being equal to the power of 2 represented by the corresponding bit of the first integer having a value of 1; and
adding together the stored bit strings by means of at least one method according to clause 18.

20. A method of determining an integer in modular arithmetic, the method comprising: determining coefficients of terms of a series of powers of 2 (mod p), wherein each term of the series comprises a respective power of 2 (mod p) multiplied by a respective said coefficient, wherein the respective said coefficient of each said term is 0 or 1, and the sum of said terms is equal to said integer (mod p);
storing a plurality of values, wherein each said value is 2 raised to a respective power of 2 (mod p) corresponding to each term of the series for which the corresponding said coefficient has a value of 1; and
adding together the plurality of values by means of at least one method according to clause 18.

21. A computer-implemented system comprising:
a processor; and
memory including executable instructions that, as a result of execution by the processor, causes the system to perform any embodiment of the computer-implemented method as claimed in any of clauses 1 to 20.

22. A non-transitory computer-readable storage medium having stored thereon executable instructions that, as a result of being executed by a processor of a computer system, cause the computer system to at least perform an embodiment of the method as claimed in any of clauses 1 to 20.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

References

| Reference | Author, date, name & location |
|---|---|
| [1] | C.P. Schnorr (1990). 'Efficient Identification and Signatures for Cards' in G. Brassard ed. Adv. In Cryptology - Crypt 239-252. Springer verlag (1990) lecture notes in Computer Science nr 435. |

The invention claimed is:

1. A method of enabling knowledge proof in a blockchain transaction, the method comprising:
    generating, at a verifier computing system, a first blockchain transaction comprising a locking script, the locking script comprising:
        (i) fourth data based on a public key of a public-private key pair of a cryptography system,
        (ii) second data, and
        (iii) a prime number shared between the verifier computing system and a prover computing system that are outside of a blockchain network, and wherein the prime number is used in computation of intermediate results to validate the first blockchain transaction;
    wherein the first blockchain transaction is redeemable by means of a second blockchain transaction comprising an unlocking script, the unlocking script including:
        (i) first data based on a combination of an ephemeral key, the second data and a private key of the public-private key pair of the cryptography system, wherein the public key of the public-private key pair of the cryptography system is based on an integer generator raised to a first power, wherein the first power is based on the private key, and
        (ii) third data based on the integer generator raised to a second power that is different than the first power, wherein the second power is based on the ephemeral key;

transmitting, by the verifier computing system, the first blockchain transaction to the blockchain network for validation; and responsive to receiving an indication of a success validation of the first blockchain transaction by the blockchain network, generating the second blockchain transaction to enable redemption of the first blockchain transaction on the blockchain network, the second blockchain transaction being generated by the prover computing system and the redemption of the first blockchain transaction is performed on the blockchain network based on modular arithmetic operations, wherein execution of the locking and unlocking scripts on the blockchain network functions as a proof of knowledge that the prover computing system possesses the private key of the public-private key pair, and wherein the public key, components of the first data, the fourth data, and the intermediate results are pre-computed off-chain.

2. The method according to claim 1, wherein the integer generator is 2.

3. The method according to claim 1, wherein the second data is provided by the verifier computing system.

4. The method according to claim 1, further comprising: sending, at the verifier computing system, the second data to the prover computing system separately from the first blockchain transaction.

5. The method according to claim 1, wherein the first data is of the form:

$$y = r + s \cdot c \mod q,$$

where y is the first data, r is the ephemeral key, s the private key, c is the second data and q is prime.

6. The method according to claim 1, wherein the second data is provided based on a message.

7. The method according to claim 6, wherein the message includes data for implementing a smart contract.

8. The method according to claim 6, wherein the second data is of the form:

$$c = H(x \| m) \mod q$$

where c is the second data, x is the third data, m is the message, q is prime and H is a hash function.

9. The method according to claim 6, further comprising: receiving, at the verifier computing system, the message.

10. The method according to claim 1, wherein the ephemeral key is shared between the verifier and the prover computing systems.

11. The method according to claim 1, further comprising: receiving, by the verifier computing system, said public key.

12. The method according to claim 1, further comprising: receiving, by the verifier computing system, said first data and said second data.

* * * * *